US012237565B2

United States Patent
Han et al.

(10) Patent No.: US 12,237,565 B2
(45) Date of Patent: Feb. 25, 2025

(54) CLAMPING DEVICE FOR BASE STATION ANTENNA

(71) Applicant: KMW INC., Hwaseong-si (KR)

(72) Inventors: Yong Hee Han, Osan-si (KR); In Ho Kim, Yongin-si (KR); Hyoung Seok Yang, Hwaseong-si (KR); Seong Man Kang, Hwaseong-si (KR); Dae Myung Park, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 163 days.

(21) Appl. No.: 17/847,396

(22) Filed: Jun. 23, 2022

(65) Prior Publication Data
US 2022/0328949 A1    Oct. 13, 2022

Related U.S. Application Data

(63) Continuation of application No. PCT/KR2020/018779, filed on Dec. 21, 2020.

(30) Foreign Application Priority Data

Dec. 27, 2019 (KR) .......... 10-2019-0176805
Apr. 20, 2020 (KR) .......... 10-2020-0047510

(51) Int. Cl.
*H01Q 1/12* (2006.01)
*H01Q 1/24* (2006.01)
*H01Q 3/02* (2006.01)

(52) U.S. Cl.
CPC ......... *H01Q 1/1242* (2013.01); *H01Q 1/1228* (2013.01); *H01Q 1/246* (2013.01); *H01Q 3/02* (2013.01)

(58) Field of Classification Search
CPC .... H01Q 1/1242; H01Q 1/1228; H01Q 1/246; H01Q 3/02
See application file for complete search history.

(56) References Cited

U.S. PATENT DOCUMENTS 6,031,508 A    2/2000  Ishizuka et al.
8,736,493 B2*  5/2014  Ai .................. H01Q 3/26
                                          342/373

(Continued)

FOREIGN PATENT DOCUMENTS

CN    101944648 A    1/2011
CN    206789681 U    12/2017

(Continued)

OTHER PUBLICATIONS

International Search Report mailed Mar. 26, 2021 for International Application No. PCT/KR2020/018779 and its English translation.
Korean office action mailed Apr. 5, 2021 for Korean Application No. 10-2020-0047510.
Non-final Office Action mailed Jul. 11, 2023 from the Japanese Patent Office for Japanese Application No. 2022-539007.

(Continued)

*Primary Examiner* — Nkeisha Smith
(74) *Attorney, Agent, or Firm* — Insight Law Group, PLLC; Seung Lee

(57) ABSTRACT

The present invention relates to a clamping device for a base station antenna and, more particularly, to a clamping device for a base station antenna, comprising: a guide arm unit which is arranged to extend horizontally to a side, so as to be perpendicular to a support pole arranged vertically; and a tilting unit which is arranged in the guide arm unit and adjusts the tilting angle with respect to the support pole by moving, based on a lower end portion of an antenna module having a fixed hinge position, an upper end portion of the antenna module in the horizontal direction in the guide arm unit. Thus, an advantage of improving the convenience of installation work and reliability of a product can be provided.

20 Claims, 16 Drawing Sheets

(56) References Cited

U.S. PATENT DOCUMENTS

| | | | |
|---|---|---|---|
| 10,079,423 B2 | 9/2018 | Asrokin et al. | |
| 10,476,127 B2 * | 11/2019 | Kim | H01Q 1/1207 |
| 10,511,090 B2 * | 12/2019 | Clifford | H01Q 3/005 |
| 11,450,940 B2 * | 9/2022 | Clifford | H01Q 1/125 |
| 11,811,129 B2 * | 11/2023 | Clifford | H01Q 1/1228 |
| 2011/0168855 A1 * | 7/2011 | Bonczyk | H01Q 1/1242 |
| | | | 248/201 |
| 2014/0103184 A1 | 4/2014 | Asrokin et al. | |
| 2015/0136920 A1 * | 5/2015 | Hemmervall | F16B 5/0233 |
| | | | 248/201 |
| 2015/0144758 A1 * | 5/2015 | Kolokotronis | H01Q 1/1228 |
| | | | 248/282.1 |
| 2016/0211576 A1 * | 7/2016 | Vassilakis | H01Q 1/1228 |
| 2016/0261030 A1 * | 9/2016 | Kim | H01Q 1/1264 |
| 2016/0352042 A1 * | 12/2016 | Wankoff | H01R 13/6315 |
| 2018/0013200 A1 * | 1/2018 | Clifford | H01Q 3/005 |
| 2020/0194884 A1 * | 6/2020 | Clifford | H01Q 1/125 |
| 2021/0194109 A1 * | 6/2021 | Shao | H01Q 1/1242 |

FOREIGN PATENT DOCUMENTS

| | | | |
|---|---|---|---|
| JP | 10-313204 | A | 11/1998 |
| JP | 2001-292015 | A | 10/2001 |
| JP | 2005-051409 | A | 2/2005 |
| JP | 2011-078053 | A | 4/2011 |
| JP | 2012-034088 | A | 2/2012 |
| KR | 10-0323593 | B1 | 4/2002 |
| KR | 10-2003-0069260 | A | 8/2003 |
| KR | 10-478593 | B1 | 3/2005 |
| KR | 20-0456433 | Y1 | 10/2011 |

OTHER PUBLICATIONS

Non-final Office Action mailed on May 25, 2024 from the Chinese Patent Office for Chinese Application No. 202080090052.6.
Extended European Search Report mailed on Apr. 8, 2024 from the European Patent Office for European Application No. 20905104.4.

* cited by examiner (a)                                (b)

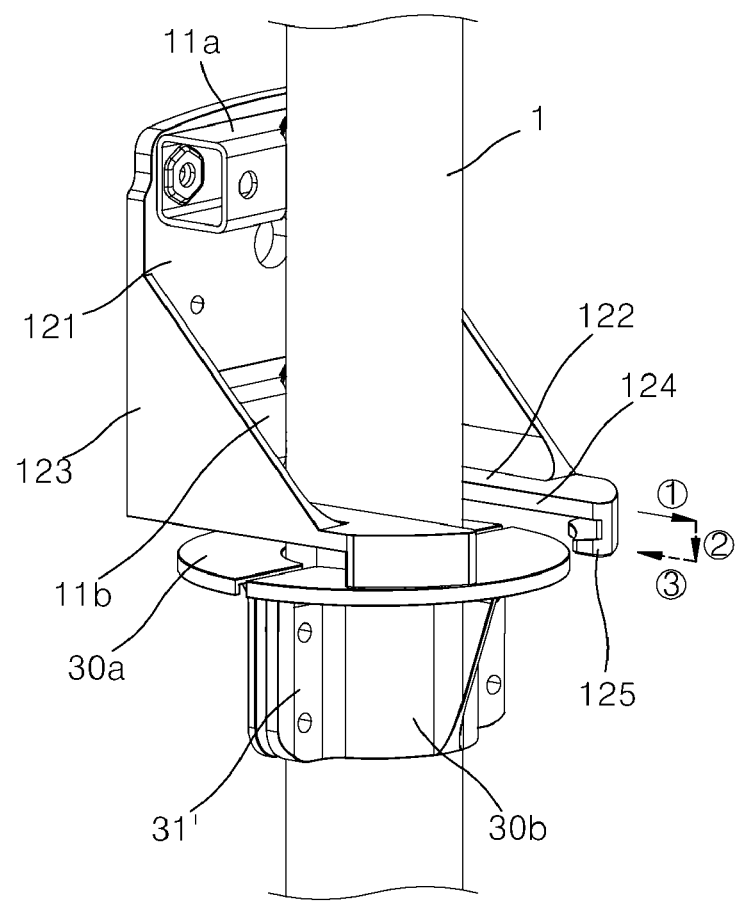

(a)          (b)

CLAMPING DEVICE FOR BASE STATION ANTENNA

CROSS-REFERENCE TO RELATED APPLICATIONS

This application is a Continuation of International Application No. PCT/KR2020/018779, filed on Dec. 21, 2020, which claims the benefit of and priority to Korean Patent Application Nos. 10-2019-0176805, filed on Dec. 27, 2019; and 10-2020-0047510, filed on Apr. 20, 2020, the disclosure of which are herein incorporated by reference in their entirety.

TECHNICAL FIELD

The present disclosure relates to a clamping device for a base station antenna. More particularly, the present disclosure relates to a clamping device for a base station antenna, the clamping device enabling the base station antenna to be mounted on a pole so as to be smoothly tilted in a remote manner.

BACKGROUND ART

In a mobile communication system, a "base station" refers to a system that routes (or relays) radio frequencies of mobile devices in a cell. Such base stations are generally disposed on the roofs of buildings to relay radio frequencies of mobile devices. Thus, base stations are provided in units of cells, and serve to not only provide an interface function between mobile devices and a switching center but also control transmission of incoming and outgoing signals, call channel assignment, call channel monitoring, and the like in units of cells. As antenna devices used in base stations, control antennas capable of performing beam tilting in a vertical or horizontal direction have been distributed due to a variety of advantages thereof.

As mobile communications services become popular, the distribution of antenna devices that provide a wireless network environment that can provide more reliable services is increasing. The trend of mobile communications services has moved from second-generation (2G) services only supporting call services through 3G, 4G, and pre-5G services to 5G services that have recently been established. Such 5G mobile communications antenna devices may be mounted together with conventional 4G and pre-5G devices, so that the mounting positions thereof may be shared.

However, when mounting of a conventional base station antenna device on a pole is completed, it is significantly difficult for an operator to access an antenna module disposed at a high position to readjust the directivity of the antenna module, which is problematic.

DISCLOSURE

Technical Problem

Accordingly, the present disclosure has been made keeping in mind the above problems occurring in the prior art, and an objective of the present disclosure is to provide a clamping device for a base station antenna, wherein the tilting of an antenna module mounted on a pole can be remotely adjusted.

In addition, another objective of the present disclosure is to provide a clamping device for a base station antenna, wherein an antenna module can be easily mounted and coupled to the pole.

The objective of the present disclosure is not limited to the aforementioned description, and other objectives not explicitly disclosed herein will be clearly understood by a person having ordinary skill in the art from the description provided hereinafter.

Technical Solution

Provided is a clamping device for a base station antenna according to an embodiment of the present disclosure. The clamping device may include: a guide arm unit horizontally extending to one side to perpendicularly intersect a vertically disposed pole; and a tilting unit disposed in the guide arm unit and configured to adjust a tilting angle with respect to the pole by horizontally moving, with respect to a bottom portion of the antenna module having a fixed hinge position, a top portion of the antenna module within the guide arm unit.

The tilting unit may include: a screw bolt longitudinally extending in the guide arm unit and having a male thread on an outer circumferential portion; and a tilting drive unit configured to move along the screw bolt and hinge-coupled to a top end of the antenna module through an upper pivot link.

The tilting drive unit may include: a drive unit housing having a predetermined space therein; a drive motor provided in a motor housing coupled to the drive unit housing and configured to be electrically driven; a drive gear configured to rotate in concert with a rotation shaft of the drive motor extending from the motor housing toward the drive unit housing and having gear teeth on an outer circumferential surface; and a moving gear having a female thread formed at the center of rotation such that the screw bolt extends through and is coupled to the moving gear and gear teeth formed on the outer circumferential surface to be engaged with the drive gear.

The tilting drive unit may further include: a drive bearing support rotatably supporting the drive gear with respect to the drive unit housing; and a moving bearing support rotatably supporting the moving gear with respect to the drive unit housing.

The tilting drive unit may further include: a pair of guide rails disposed on one widthwise side and the other widthwise side of the guide arm unit, respectively, and extending in a longitudinal direction of the guide arm unit; and a pair of moving guide blocks fixed to outer portions of the drive unit housing and coupled to the pair of guide rails, respectively, to mediate the coupling of the drive unit housing.

The guide arm unit may include: a housing connector configured to mediate the coupling of the guide arm unit to the pole; and a guide housing connected to the housing connector and horizontally extending in a direction perpendicular to the pole. The guide housing may have a downwardly-open C-shaped vertical cross-section.

The clamping device may further include: an upper coupling clamp and a lower coupling clamp coupled to the pole and spaced apart from each other a predetermined distance in a vertical direction; and a seating clamp provided below the upper coupling clamp and configured to seat and fix the housing connector thereon. The guide arm unit may be coupled to the pole by being fixed to the pole by means of the upper coupling clamp after the housing connector is seated on the seating clamp.

The upper coupling clamp may be coupled to the guide arm unit hinge-fixed to a top end of the antenna module by means of the upper pivot link, and the lower coupling clamp is coupled to the antenna module by means of a pivot bracket hinge-fixed to a lower pivot link fixed to a bottom end of the antenna module.

In addition, the upper pivot link may be configured such that one end is hinge-fixed to the antenna module in a hinge-pivotable manner and the other end is hinge-fixed to the guide arm unit in a hinge-pivotable manner, and the lower pivot link is configured such that one end is fixed to the antenna module and the other end is hinge-fixed to the pivot bracket in a hinge-pivotable manner.

The seating clamp may include: a pole coupling portion tightly coupled to an outer circumferential surface of the pole; and a seating flange portion perpendicularly bent and radially extending from an upper portion of the pole coupling portion, thereby allowing the housing connector to be seated thereon.

The housing connector may include: a vertical portion vertically disposed to be surface-coupled to the guide housing; a horizontal portion extending from a bottom end of the vertical portion to be surface-coupled to an upper surface of the seating flange portion while surrounding the outer circumferential surface of the pole; and a locking portion bent from a front end of the horizontal portion to be locked to a peripheral portion of the seating flange portion.

The upper coupling clamp and the lower coupling clamp may include: one-side clamp blocks in tight contact with portions of the outer circumferential surface of the pole facing the antenna module; other-side clamp blocks in tight contact with portions of the outer circumferential surface of the pole opposite the one-side clamp blocks; and at least two fixing bolts extending through the one-side clamp blocks and the other-side clamp blocks so as to be nut-fastened.

The lower coupling clamp may be hinge-fixed to a bottom end of the antenna module by means of a lower pivot link.

The tilting unit may be remotely drive-controlled by a wireless or wired medium.

The male thread of the screw bolt may include one of a ball screw shape into which a ball having a predetermined size is inserted and a trapezoidal shape.

Also provided is clamping device for a base station antenna according to another embodiment of the present disclosure. The clamping device may include: a guide arm unit vertically extending to one side to be parallel to a vertically disposed pole; and a tilting unit disposed in the guide arm unit and configured to adjust a tilting angle with respect to the pole by vertically moving, with respect to a bottom portion of the antenna module having a fixed hinge position, a top portion of the antenna module within the guide arm unit.

Advantageous Effects

The clamping device for a base station antenna according to embodiments of the present disclosure can realize various effects as follows.

First, even in the case that an operator does not approach an antenna module mounted on a pole, a tilting angle can be remotely adjusted as required, thereby facilitating the readjustment of the directivity of the antenna module.

Second, since the operator is not required to climb a tall pole to a high position to adjust the directivity of the base station antenna, the convenience of the operation of the operator can be improved.

Third, since the tilting unit can be disposed on the pole in a variety of directions, the degree of freedom of design can be improved.

DESCRIPTION OF DRAWINGS

FIGS. 12A to 12C are perspective views illustrating a process of mounting the guide fixing bracket on the pole;

Figure 1:
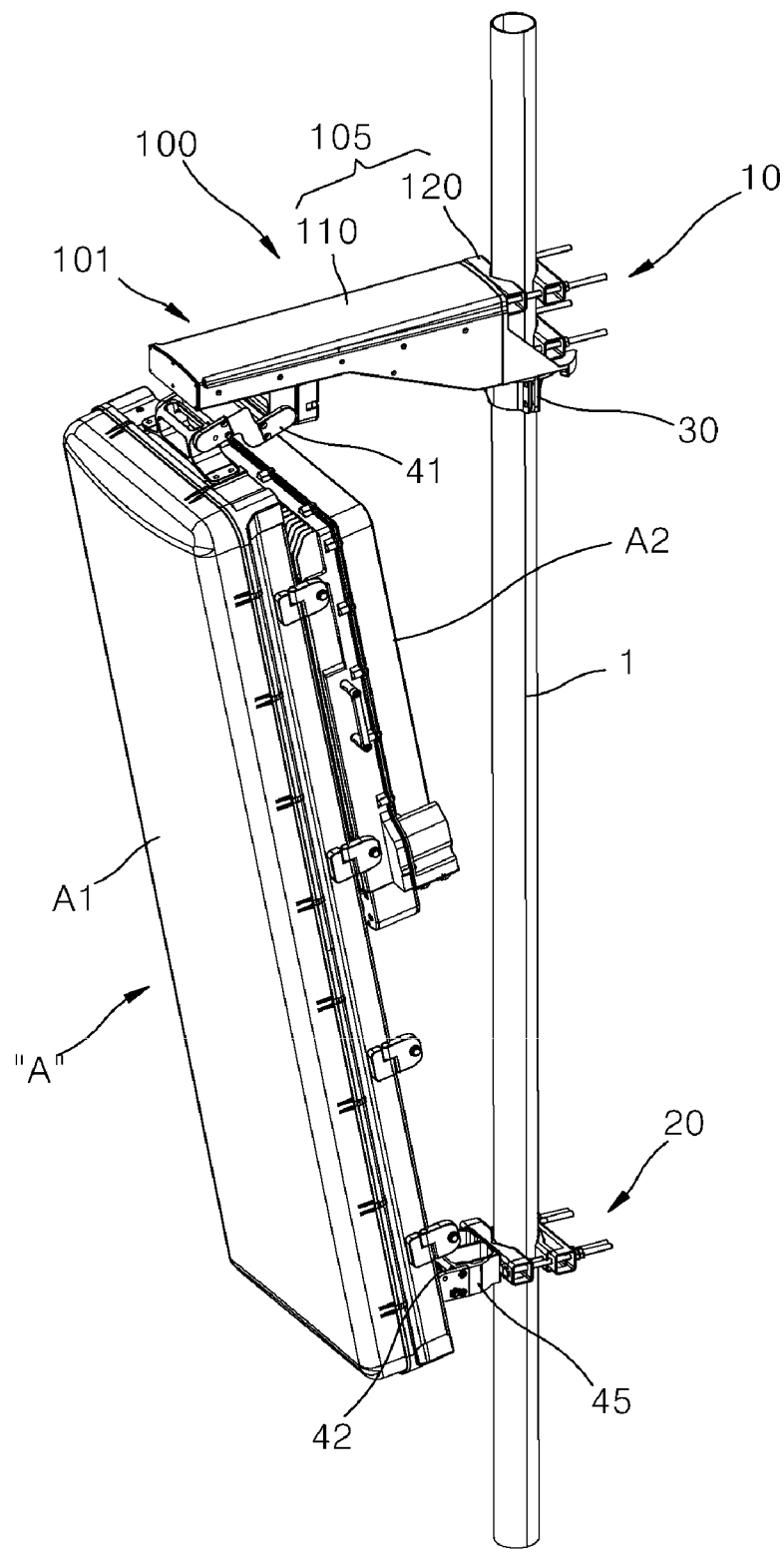
FIG. 1 is a top front perspective view illustrating a clamping device for a base station antenna according to an embodiment of the present disclosure.

| <Description of the Reference Numerals in the Drawings> | |
|---|---|
| A: antenna module | A1: antenna device |
| A2: RRH | 1: pole |
| 10: upper coupling clamp | |
| 11a, 11b: upper one-side clamp block | |
| 12a, 12b: upper other-side clamp block | |
| 13: upper fixing bolt | |
| 14: upper fixing nut | 20: lower coupling clamp |
| 21: lower one-side clamp block | |
| 22: lower other-side clamp block | |
| 23: at least two lower fixing bolts | |
| 24: at least two fixing nuts | |
| 30: seating clamp | 30a: inner seating clamp |
| 30b: outer seating clamp | |
| 41: upper pivot link | |
| 42: lower pivot link | 45: pivot bracket |
| 100: clamping device | 101: tilting unit |
| 105: guide arm unit | 110: guide housing |
| 120: housing connector | 121: vertical portion |
| 122: horizontal portion | |
| 123: reinforcing portion | |
| 124: open portion | 125: locking portion |
| 130 : screw bolt | 140: tilting drive unit |
| 141: drive unit housing | |
| 142: motor housing | |
| 143: drive motor | 144: moving gear |
| 145: drive gear | 146: moving bearing support |
| 147: drive bearing support | |
| 150: guide rail | |
| 160: moving guide block | |

BEST MODE

Hereinafter, embodiments of a clamping device for a base station antenna according to the present disclosure will be described in detail with reference to the accompanying drawings.

When elements in the drawings are designated with reference numerals, like elements may be designated with like reference numerals although the elements are shown in different drawings. Further, in the following description of embodiments of the present disclosure, detailed descriptions of well-known components and functions incorporated herein will be omitted when it is determined that the description may make the subject matter in some embodiments of the present disclosure rather unclear.

Terms, such as "first", "second", "A", "B", "(a)", or "(b)" may be used to describe elements of embodiments of the present disclosure. Each of these terms is not used to define the essence, order, sequence, etc. of the corresponding element, but is used merely to distinguish the corresponding element from other elements. Unless otherwise defined, all terms used herein including technological or scientific terms have the same meanings as those generally understood by those skilled in the art. Terms defined in generally used dictionary shall be construed that they have meanings matching those in the context of the related art, and shall not be construed in ideal or excessively formal meanings unless they are clearly defined in the present application.

Figure 2:
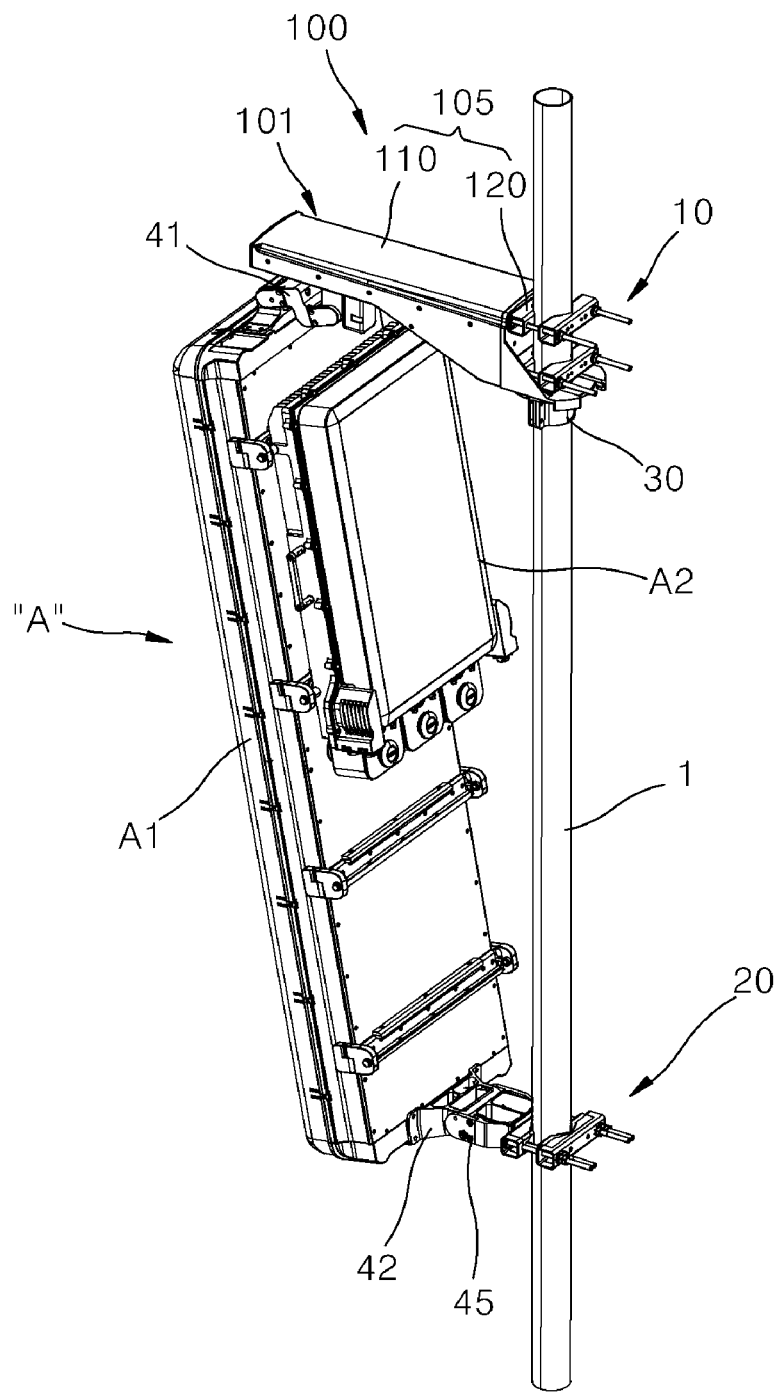
FIG. 2 is a top rear perspective view illustrating the clamping device for a base station antenna according to an embodiment of the present disclosure.
Figure 3:
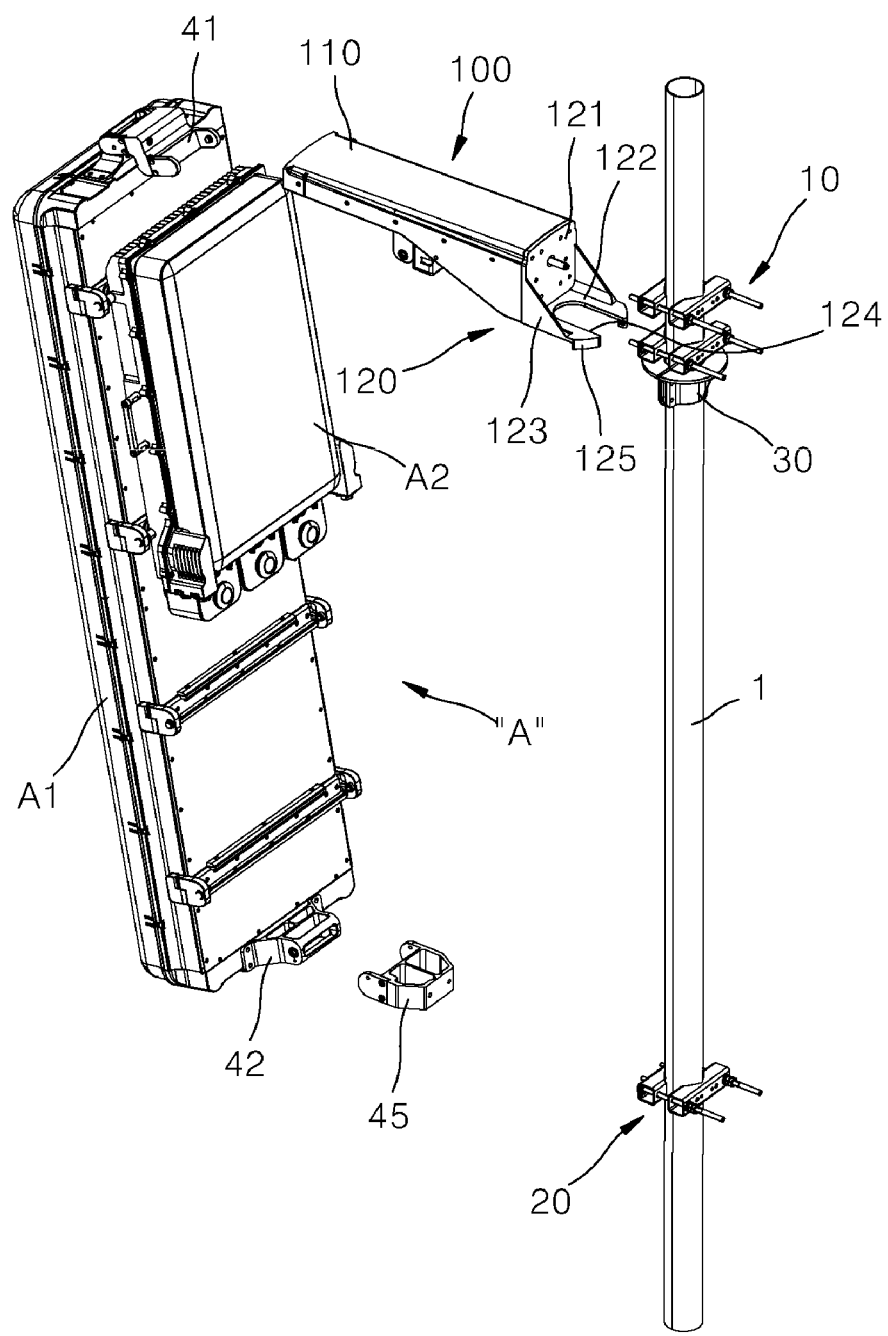
FIG. 3 is an exploded perspective view of FIGS. 1 and 2.
Figure 4:
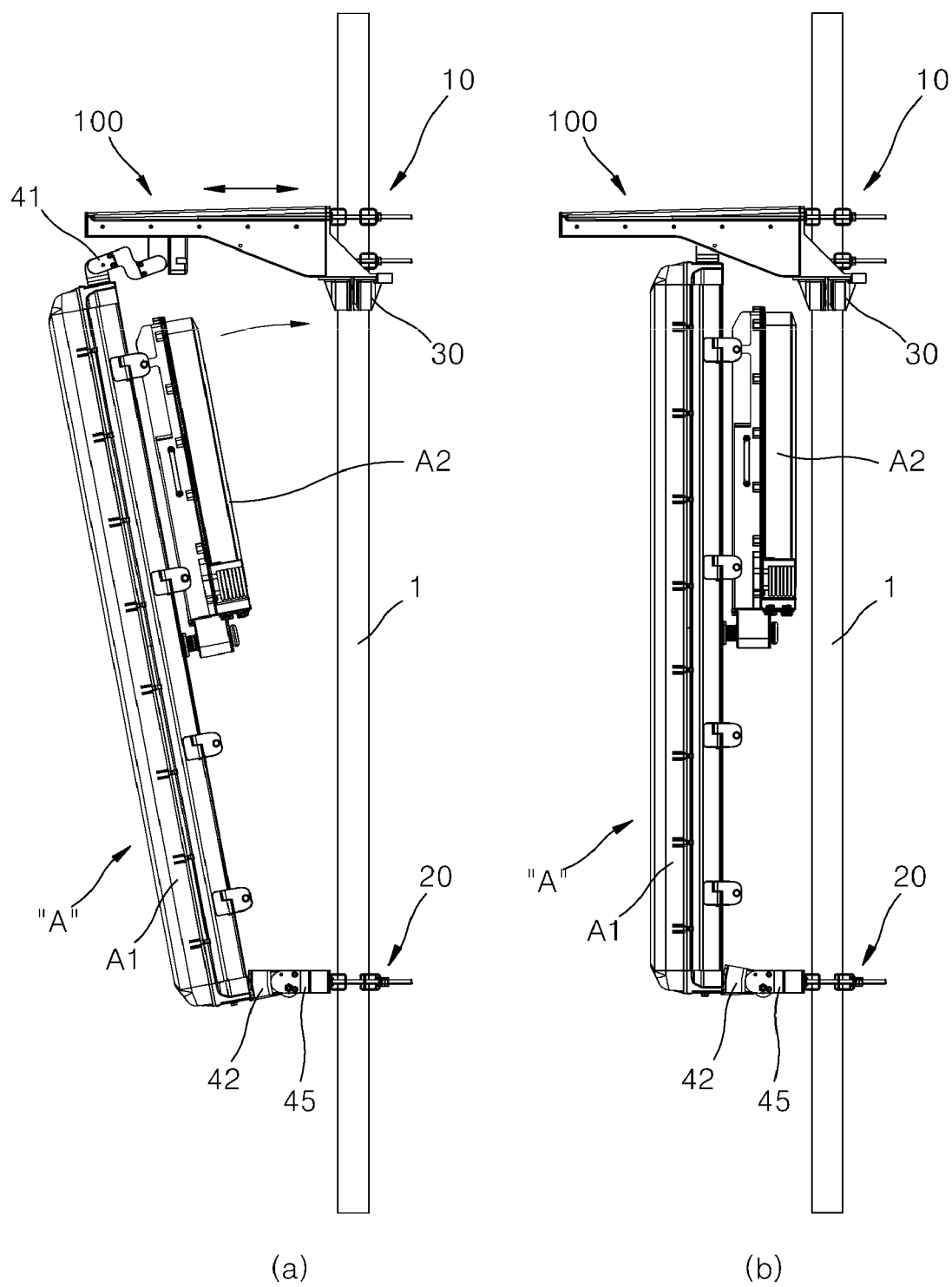
FIG. 4 is a side view illustrating the tilting of the clamping device for a base station antenna according to an embodiment of the present disclosure.

FIG. 1 is a top front perspective view illustrating a clamping device for a base station antenna according to an embodiment of the present disclosure, FIG. 2 is a top rear perspective view illustrating the clamping device for a base station antenna according to an embodiment of the present disclosure, FIG. 3 is an exploded perspective view of FIGS. 1 and 2, and FIG. 4 is a side view illustrating the tilting of the clamping device for a base station antenna according to an embodiment of the present disclosure.

As illustrated in FIGS. 1 to 4, a clamping device 100 for a base station antenna according to an embodiment of the present disclosure includes a guide arm unit 105 and a tilting unit 101. The guide arm unit 105 may serve to guide the movement of the tilting unit 101, and the tilting unit 101 may serve to adjust the tilting angle of an antenna module A while moving guided by the guide arm unit 105.

Here, the antenna module A may include an antenna device (hereinafter, designated with a reference sign "A1") having at least one frequency band and a remote radio head (RRH, hereinafter, designated with a reference sign "A2") connected to the antenna device and configured to perform functions of, for example, receiving and amplifying or retransmitting a weakened signal between a base station of a mobile communication system and a mobile communications device (or a mobile device), shaping a distorted waveform, and readjusting timing.

As illustrated in FIGS. 1 and 2, the guide arm unit 105 may be disposed to horizontally extend in one direction so as to perpendicularly intersect a pole 1 extending vertically in the top-bottom direction. The pole 1 may be substantially shaped as a hollow cylinder. The guide arm unit 105 may be firmly and horizontally disposed on the outer surface of the pole 1 having the above-described configuration using upper coupling clamps 10 and a seating clamp 30 to be described later.

According to an embodiment of the present disclosure, as illustrated in FIGS. 1 and 2, the pole 1 will be described as being disposed vertically in the top-bottom direction in a restrictive manner. However, although not shown in the drawings, the pole 1 may, of course, be horizontally disposed on a wall surface of a house. Here, on the front end of the pole 1 disposed parallel to the wall surface of the housing, a vertical pole (not shown) perpendicularly coupled to the pole 1 may be further provided to replace the function of the pole 1 disposed vertically in the top-bottom direction with respect to the ground surface. Hereinafter, for the sake of description, terms for directions used herein will be defined with respect to the pole 1 disposed vertically in the top-bottom direction with respect to the horizontal ground surface, irrespective of the direction in which the pole 1 is disposed.

As illustrated in FIGS. 1 to 4, the guide arm unit 105 serves to guide the movement of the tilting unit 101 while limiting the distance of movement of the tilting unit 101. That is, one end of the guide arm unit 105 is coupled to the pole 1 and the other end of the guide arm unit 105 is provided in the shape of a cantilever at a position extending a predetermined distance from the pole 1. Thus, the movement of the tilting unit 101 may be limited to between one end and the other end of the guide arm unit 105.

More specifically, as illustrated in FIG. 3, the guide arm unit 105 may include a housing connector 120 configured to mediate the coupling of the guide arm unit 105 to the pole 1 and a guide housing 110 connected to the housing connector 120 and horizontally extending in a direction perpendicular to the pole 1.

Here, the guide housing 110 may be configured to have a downwardly-open C-shaped vertical cross-section. This configuration is intended to prevent interference between an upper pivot link 41 and the tilting unit 101 in movement, wherein the upper pivot link 41 mediates the coupling between the guide housing 110 and the top end of the antenna module A Meanwhile, in a state in which the housing connector 120 is seated on the seating clamp 30 coupled to the pole 1 to be described later, the housing connector 120 serves to firmly fix the pole 1 using the upper coupling clamps 10 to be described later. A specific shape and structure of the housing connector 120 will be described in more detail in the following description of the seating clamp 30.

As illustrated in FIGS. 1 to 4, the tilting unit 101 may be disposed in the guide arm unit 105, and serve to adjust the tilting angle with respect to the pole 1 by horizontally moving the top end of the antenna module A in the guide arm unit 105 with respect to the bottom end of the antenna module A, the hinge position of which is fixed.

More specifically, as illustrated in FIG. 3, the antenna module A may be hinge-pivotably connected to the tilting unit 101 using the upper pivot link 41 provided on the top portion of the antenna module A, and be hinge-pivotably connected to the pole 1 using a lower pivot link 42 provided on the bottom portion of the antenna module A.

Here, as illustrated in FIG. 3, the upper coupling clamps 10 and the seating clamp 30 may be provided on the pole 1 to mediate the coupling between the guide arm unit 105 configured to tilt the top end of the antenna module A and the pole 1. In addition, a lower coupling clamp 20 may be provided to mediate the coupling of a pivot bracket 45 configured to mediate hinge coupling to the lower pivot link 42 connected to the bottom end of the antenna module A.

The upper pivot link 41 may be hinge-coupled such that one end of the upper pivot link 41 coupled to the antenna module A and the other end of the upper pivot link coupled to the tilting unit 101 are relatively hinge-pivotable. The lower pivot link 42 may be hinge-coupled such that one end of the lower pivot link 42 coupled to the antenna module A is directly screw-engaged so as to not be hinge-pivotable and the other end of the lower pivot link 42 coupled to the pivot bracket 45 is relatively hinge-pivotable. Thus, the hinge position of the antenna module A connected using the upper pivot link 41 changes depending on the position of the tilting unit 101 in the guide arm unit 105, but the hinge position of the antenna module A connected using the lower pivot link 42 may be defined as being relatively fixed.

Figure 5:
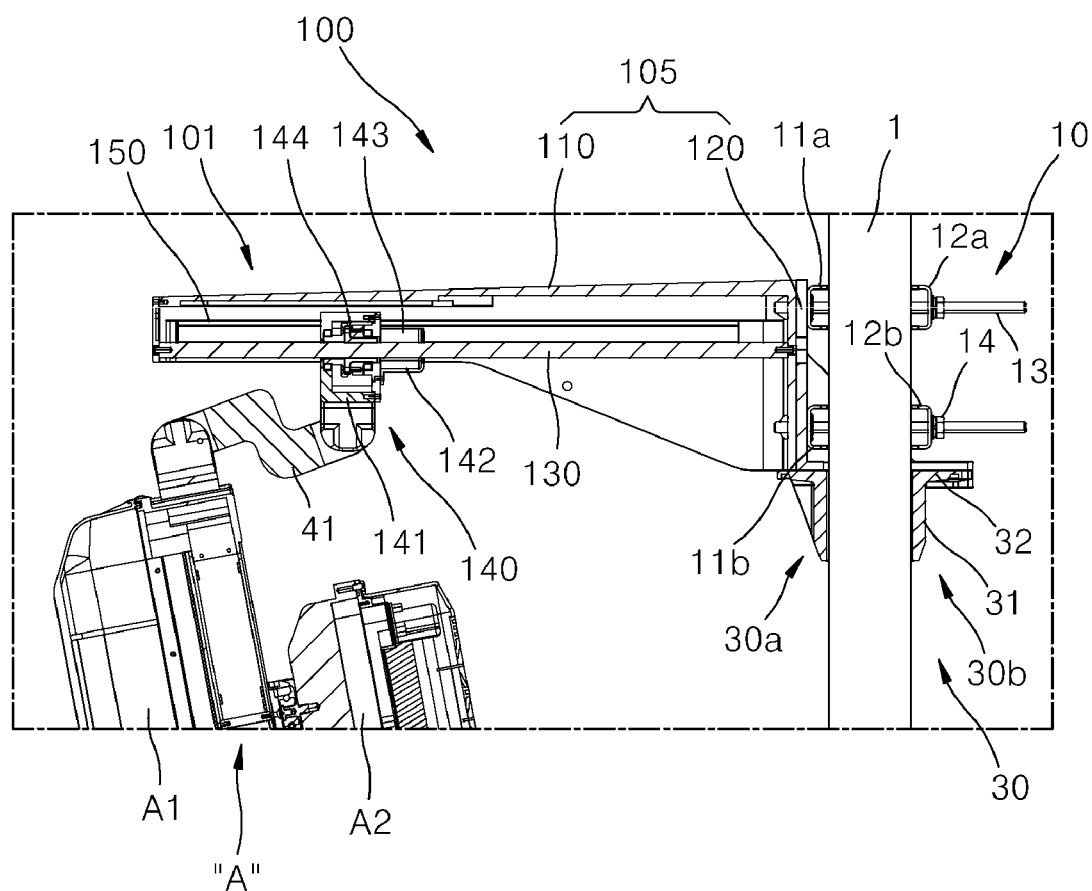
FIG. 5 is a side cross-sectional view illustrating a tilting part in the components of FIGS. 1 and 2.
Figure 6:
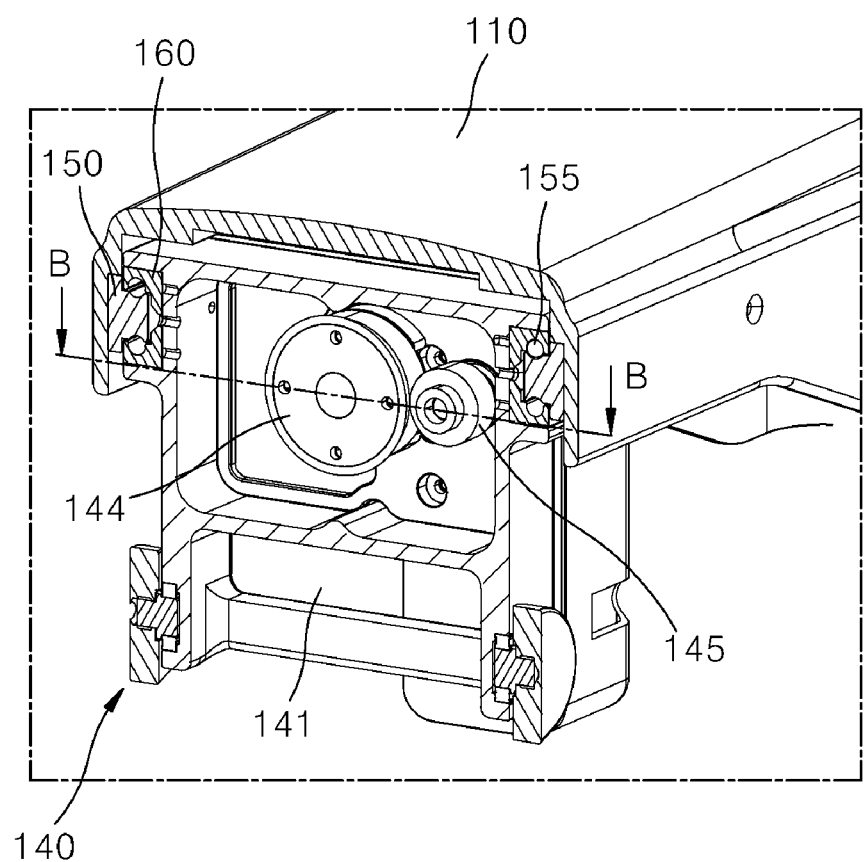
FIG. 6 is a cutaway perspective view taken along the line A-A in FIG. 1.
Figure 7:
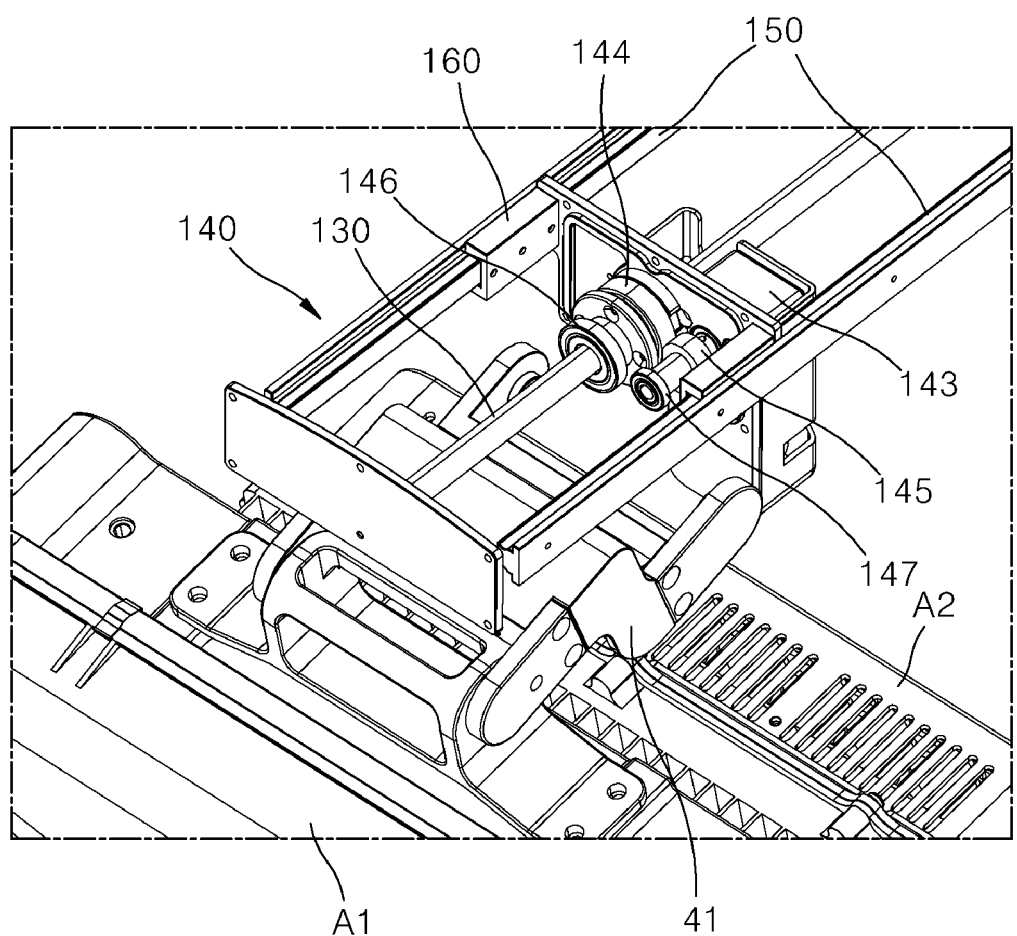
FIG. 7 is an internal perspective view illustrating the tilting part from which the guide housing in the components of FIGS. 1 and 2 is removed.
Figure 8:
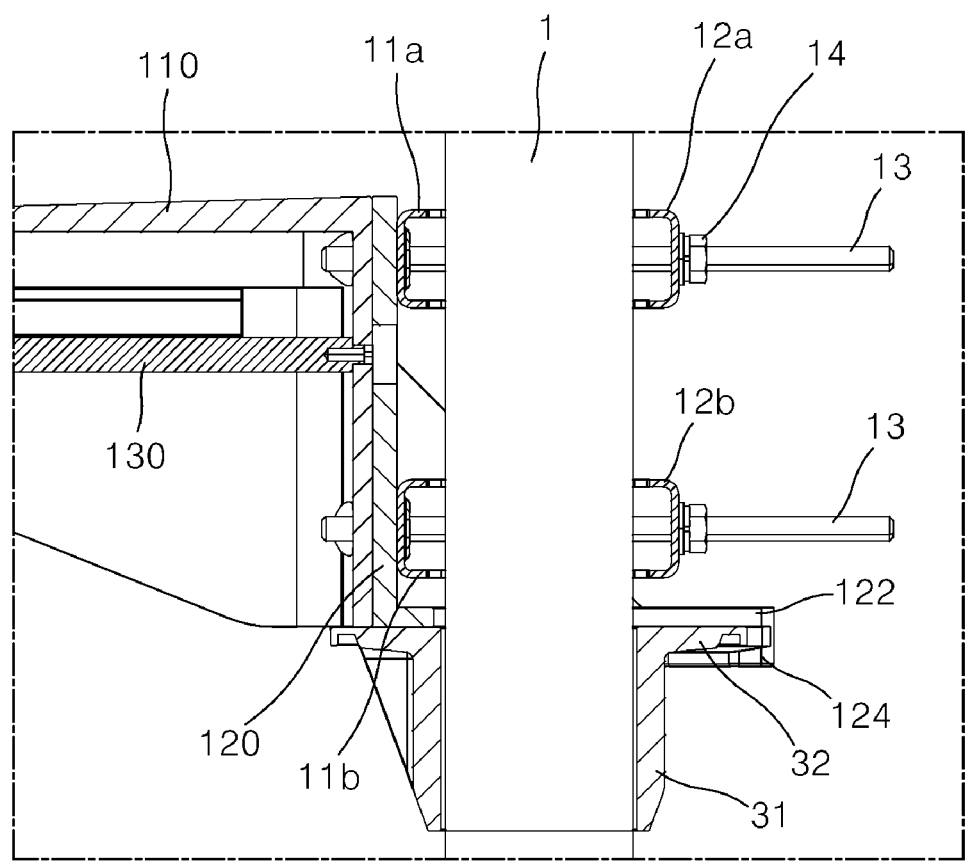
FIG. 8 is a partial cutaway perspective view taken along the line B-B in FIG. 6.
Figure 9:
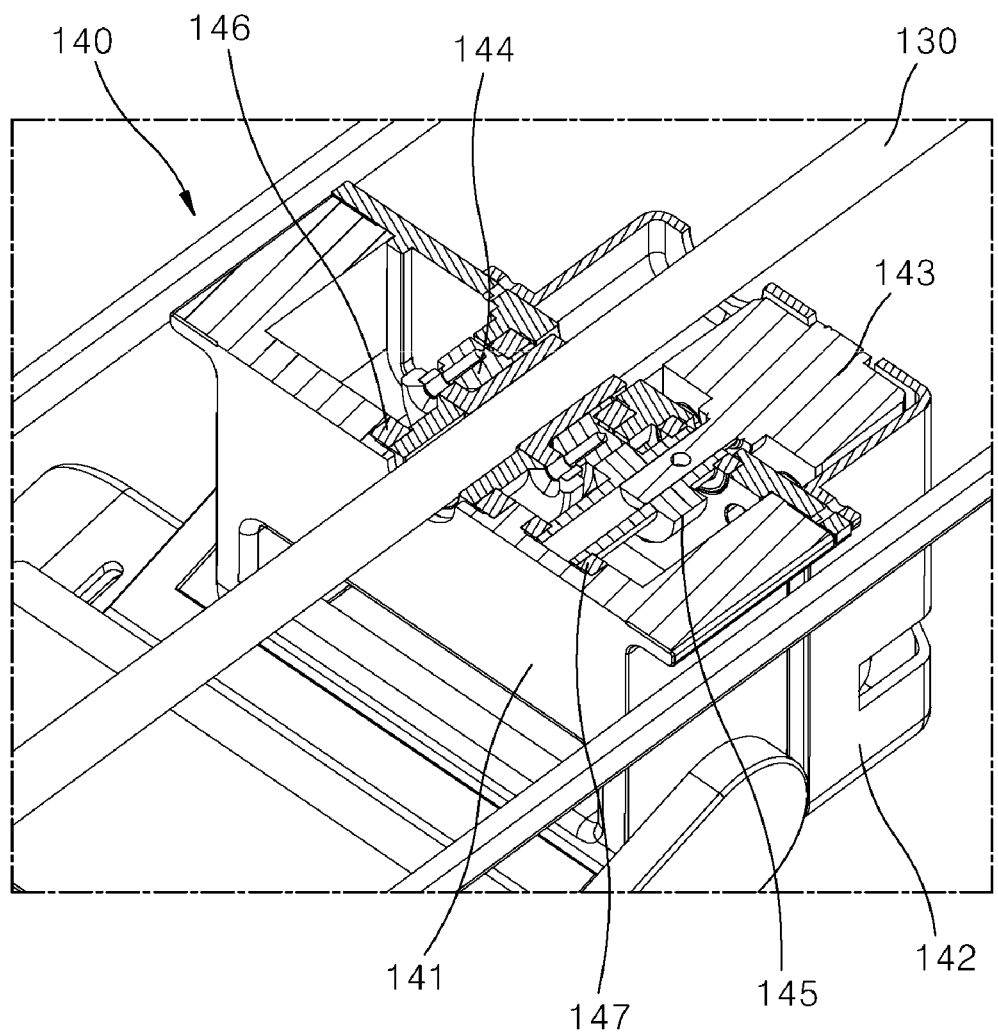
FIG. 9 is an expanded cross-sectional view in which a part of FIG. 5 is expanded.

FIG. 5 is a side cross-sectional view illustrating the tilting unit in the components of FIGS. 1 and 2, FIG. 6 is a cutaway perspective view taken along the line A-A in FIG. 1, FIG. 7 is an internal perspective view illustrating the tilting unit from which the guide housing in the components of FIGS. 1 and 2 is removed, FIG. 8 is a partial cutaway perspective view taken along the line B-B in FIG. 8, and FIG. 9 is an expanded cross-sectional view in which a part of FIG. 5 is expanded.

As illustrated in FIGS. 5 to 9, the tilting unit 101 may include a screw bolt 130 longitudinally extending in the guide housing 110 among the components of the guide arm unit 105 and having a male thread on the outer circumferential surface and a tilting drive unit 140 configured to move along the screw bolt 130 and hinge-coupled to the top end of the antenna module A through the upper pivot link 41.

Here, although a male thread formed on the screw bolt 130 is not specifically illustrated in the drawings, the male thread may have one of a ball screw shape into which a ball having a predetermined size is inserted and a trapezoidal shape facilitating gear engagement.

The screw bolt 130 may be fixed to one end and the other end of the inner side of the guide housing 110 disposed to horizontally extend to perpendicularly intersect the pole 1 using fixing bolts (not shown).

As illustrated in FIGS. 5 to 9, the tilting drive unit 140 may include a drive unit housing 141 having a predetermined space therein, a drive motor 143 provided in a motor housing 142 coupled to the drive unit housing 141 and configured to be electrically driven, a drive gear 145 configured to rotate in concert with a rotation shaft of the drive motor 143 extending from the motor housing 142 toward the drive unit housing 141 and having gear teeth on the outer circumferential surface, and a moving gear 144 having a female thread formed at the center of rotation such that the screw bolt 130 extends through and is coupled to the moving gear 144 and gear teeth formed on the outer circumferential surface to be engaged with the drive gear 145.

The drive unit housing 141 has the above-described predetermined space to serve as a mounting space in which the drive gear 145 and the moving gear 144 are disposed. In addition, one portion of the drive unit housing 141 is coupled to a pair of guide rails 150 to be described later, the guide rails 150 being fixed to the widthwise inner surface of the guide housing 110, and another portion of the drive unit housing 141 is coupled to the top end of the antenna device A1 of the antenna module A using the upper pivot link 41. In response to the drive motor 143 being driven, the drive unit housing 141 below the guide housing 110 serves to move the top end of the antenna module A in the longitudinal direction (i.e., the horizontal direction) to adjust the tilting angle while being guided by the guide rails 150.

The motor housing 142 may be provided to form a separate space in one side of the drive unit housing 141, and the drive motor 143 may be fixed within the motor housing 142 such that the rotation shaft of the drive motor 143 is parallel to and spaced apart from the screw bolt 130.

The rotation shaft of the drive motor 143 may extend from inside the drive unit housing 141 and be exposed to the inside of the drive unit housing 141, and the drive gear 145 may be provided to coaxially work in concert with the rotation shaft of the drive motor 143.

Here, as illustrated in FIGS. 5, 7, and 8, the tilting drive unit 140 may further include a drive bearing support 147 rotatably supporting the drive gear 145 with respect to the drive unit housing 141 and a moving bearing support 146 rotatably supporting the moving gear 144 with respect to the drive unit housing 141.

The drive bearing support 147 and the moving bearing support 146 may serve to rotatably support the drive gear 145 and the moving gear 144, each provided rotatable within the drive unit housing 141, with respect to the drive unit housing 141. Each of the drive bearing support 147 and the moving bearing support 146 may be configured such that a plurality of bearing balls are interposed between a fixed inner wheel and a rotating outer wheel to reduce friction. Here, the inner wheels of the drive bearing support 147 and the moving bearing support 146 may be fixed with respect to the drive unit housing 141, and the outer wheels of the drive bearing support 147 and the moving bearing support 146 may be provided to rotate in concert with the drive gear 145 and the moving gear 144, respectively.

Meanwhile, as illustrated in FIGS. 5 to 9, the tilting drive unit 140 may further include the pair of guide rails 150 disposed on one widthwise side and the other widthwise side of the guide arm unit 105, respectively, and extending in the longitudinal direction of the guide arm unit 105 and a pair of moving guide blocks 160 fixed to outer portions of the drive unit housing 141 and coupled to the pair of guide rails 150, respectively, to mediate the coupling of the drive unit housing 141.

More specifically, the pair of guide rails 150 may longitudinally extend and be horizontally fixed to one widthwise side and the other widthwise side of the guide housing 110 disposed to horizontally extend in the longitudinal direction.

In addition, each of the pair of moving guide blocks 160 has a C-shaped vertical cross-section so as to be locked and coupled to the corresponding one of the pair of guide rails 150 while surrounding a portion of the outer surface of the corresponding guide rail 150. Each of the moving guide blocks 160 may be fixed to the outer surfaces of one side and the other side of the drive unit housing 141.

Here, as illustrated in FIG. 6, a bearing insertion hole 155 is formed between each of the pair of guide rails 150 and a corresponding one of the pair of moving guide blocks 160. A plurality of bearings (not shown) may be interposed in the bearing insertion hole 155 to support tilting movement between the two parts.

Figure 10:
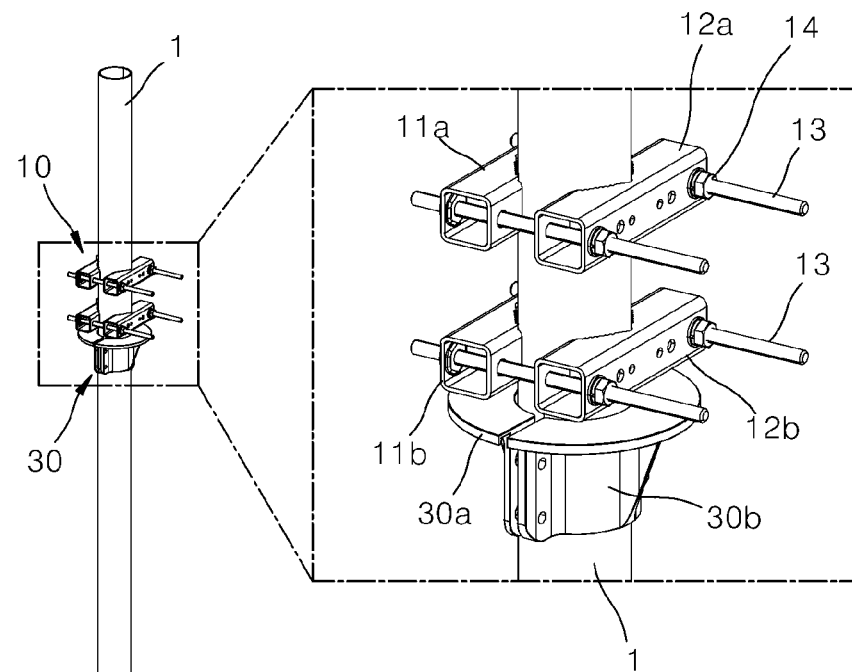
FIG. 10 depicts a perspective view, as well as enlarged views of portions, of the pole and the fixing clamp, the upper support clamp, and the lower support clamp among the components of FIGS. 1 and 2 disposed on the pole.
Figure 10:
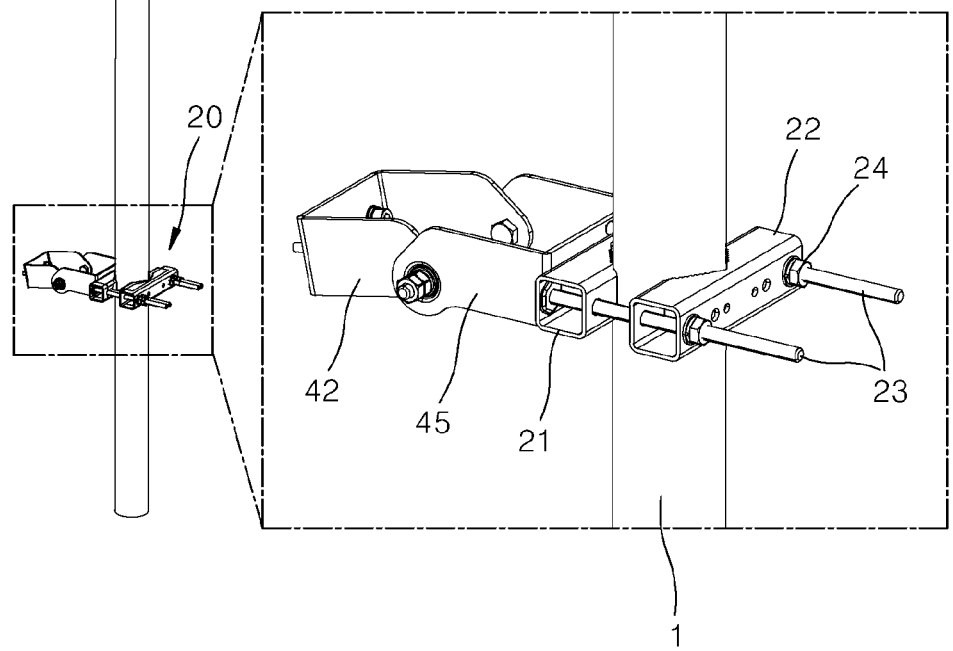
Figure 11A:
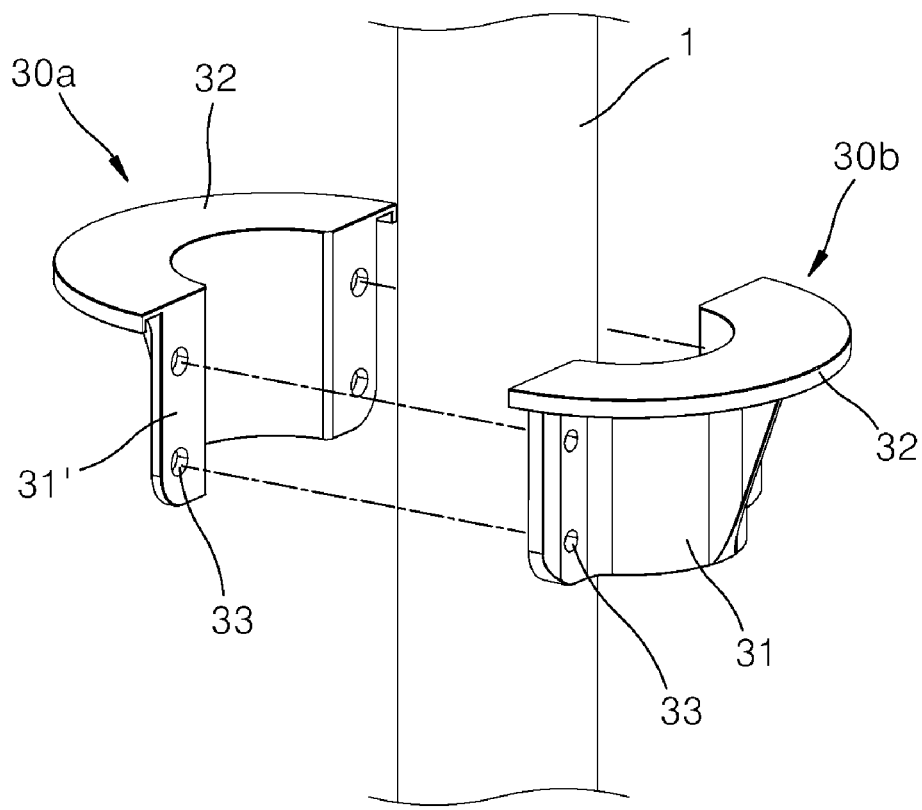
FIGS. 11A and 11B are perspective views illustrating a process of mounting the fixing clamp on the pole.
Figure 11B:
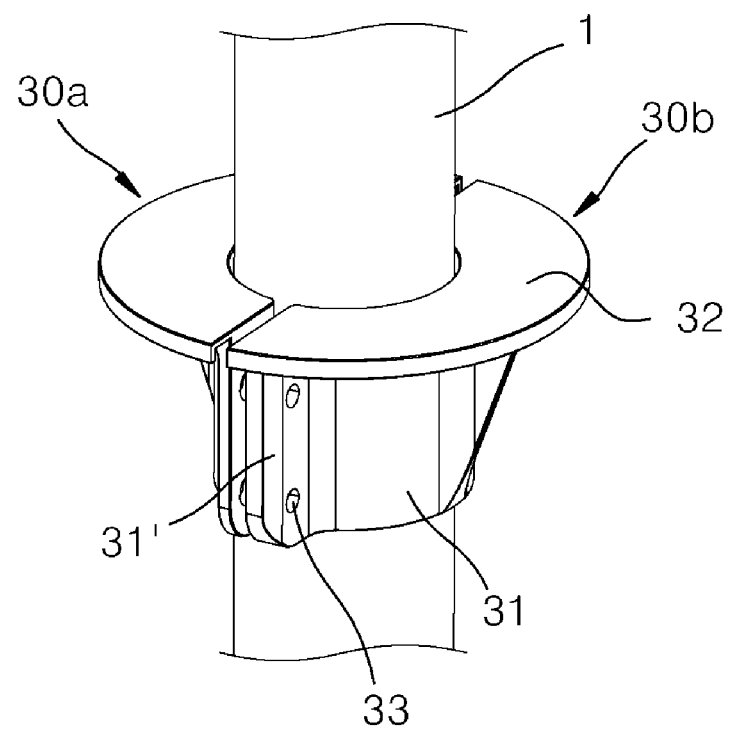
Figure 12B:
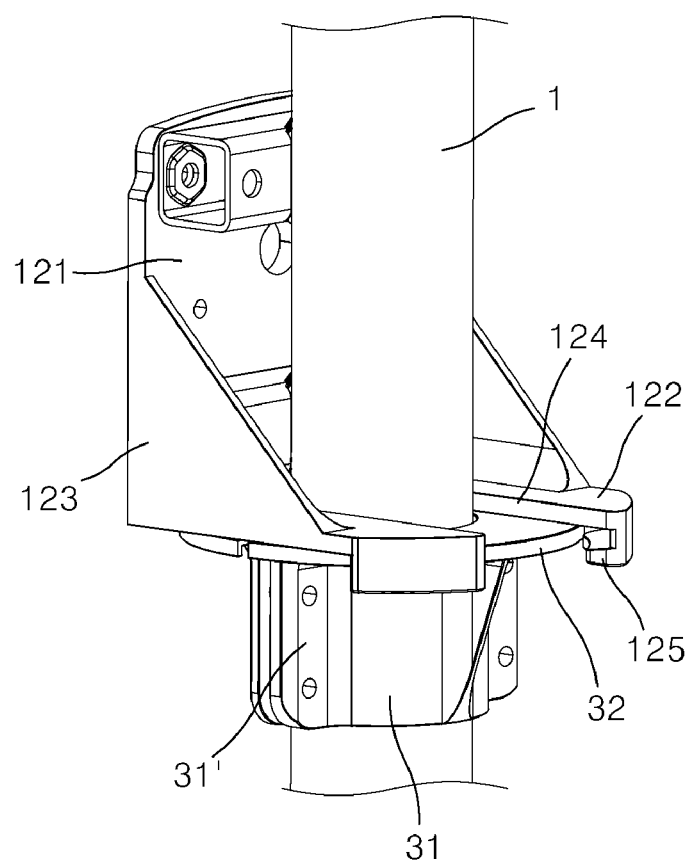
Figure 12C:
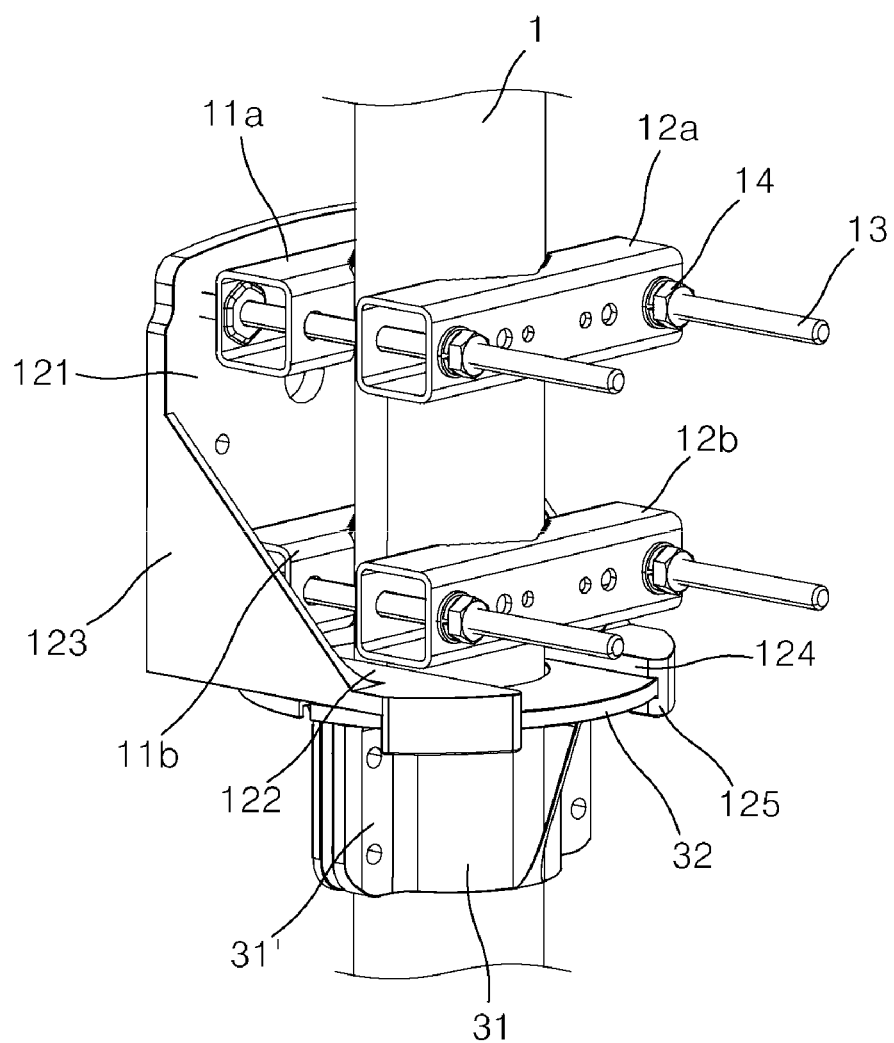

FIG. 10 depicts a perspective view of, as well as enlarged views of portions of, the pole and the fixing clamp, the upper support clamp, and the lower support clamp among the components of FIGS. 1 and 2 disposed on the pole, FIGS. 11A and 11B are perspective views illustrating a process of mounting the fixing clamp on the pole, and FIGS. 12A to 12C are perspective views illustrating a process of mounting the guide fixing bracket on the pole.

As illustrated in FIGS. 10 to 12C, an embodiment of the clamping device 100 for a base station antenna according to the present disclosure may further include the upper coupling clamps 10 and the lower coupling clamp 20 coupled to the pole 1 and vertically spaced apart from each other a predetermined distance and the seating clamp 30 provided below the upper coupling clamps 10 and configured to seat and fix the housing connector 120 thereon.

In addition, as illustrated in FIG. 10, the upper coupling clamps 10 may include upper one-side clamp blocks 11a and 11b in tight contact with portions of the outer circumferential surface of the pole 1 facing the antenna module A, upper other-side clamp blocks 12a and 12b in tight contact with portions of the outer circumferential surface of the pole 1 opposite the upper one-side clamp blocks 11a and 11b, and at least two upper fixing bolts 13 horizontally extending through the upper one-side clamp blocks 11a and 11b and the upper other-side clamp blocks 12a and 12b so as to be nut-fastened.

The upper one-side clamp blocks 11a and 11b, the upper other-side clamp blocks 12a and 12b, and the at least two upper fixing bolts 13 may be provided as single sets, respectively, as long as the guide arm unit 105 is firmly fixed to the pole 1 thereby. In an embodiment of the present disclosure, the upper one-side clamp blocks 11a and 11b are provided as two sets, the upper other-side clamp blocks 12a and 12b are provided as two sets, and the at least two upper fixing bolts 13 are provided as two sets, which are used as structures to firmly fix two portions, i.e., upper and lower portions, of the housing connector 120 among the components of the guide arm unit 105, respectively.

The at least two upper fixing bolts 13 may be fastened and fixed by upper fixing nuts 14 after having extended through all of the upper one-side clamp blocks 11a and 11b, the upper other-side clamp blocks 12a and 12b, and the housing connector 120 among the components of the guide arm unit 105 from one side to the other side of the outer circumferential surface of the pole 1.

Meanwhile, as illustrated in FIG. 10, the lower coupling clamp 20 may include a lower one-side clamp block 21 in tight contact with a portion of the outer circumferential surface of the pole 1 facing the antenna module A, a lower other-side clamp block 22 in tight contact with a portion of the outer circumferential surface of the pole 1 opposite the lower one-side clamp block 21, and at least two lower fixing bolts 23 horizontally extending through the lower one-side clamp block 21 and the lower other-side clamp block 22 so as to be nut-fastened.

The at least two lower fixing bolts 23 may be fastened and fixed on one side and the other side of the pole 1 by lower fixing nuts 24 after having passed through all of the lower one-side clamp block 21, the lower other-side clamp block 22, and the pivot bracket 45 configured to mediate hinge coupling to the lower pivot link 42 connected to the bottom end of the antenna module A.

As illustrated in FIGS. 10 to 12c, the seating clamp 30 includes an inner seating clamp 30a in tight contact with a portion of the outer circumferential surface of the pole 1 facing the antenna module A and an outer seating clamp 30b in tight contact with a portion of the outer circumferential surface of the pole 1 opposite the inner seating clamp 30a. By using fixing bolts (not shown) extending through bolt holes 33 formed in flange surfaces 31' in surface contact with each other and fixing nuts fastened to ends of the fixing bolts, the inner seating clamp 30a and the outer seating clamp 30b may be coupled to each other so as to surround the outer circumferential surface of the pole 1.

Here, as illustrated in FIGS. 11A and 11B, the seating clamp 30 may be configured to include pole coupling portions 31 tightly coupled to the outer circumferential surface of the pole 1 and seating flange portions 32 perpendicularly bent and radially extending from the upper portions of the pole coupling portions 31, thereby allowing the housing connector 120 to be seated thereon.

Although not shown in the drawings, the inner surface of each of the pole coupling portions 31 may be formed of a friction-increasing material in relation to the pole 1 or have the shape of frictional serration. Thus, when fixing force generated by the fixing bolts (not shown) and the fixing nuts (not shown) is delivered, the inner surfaces of the pole coupling portions 31 may be brought into firm contact with the outer circumferential surface of the pole 1, thereby preventing downward slip induced by the weight.

The seating clamp 30 may serve to allow the housing connector 120 among the components of the guide arm unit 105 to be reliably locked and fixed.

More specifically, referring to FIG. 3 (or FIGS. 12A and 12B), the housing connector 120 among the components of the guide arm unit 105 may include a vertical portion 121 vertically disposed to be surface-coupled to one end of the guide housing 110 facing the pole 1, a horizontal portion 122 extending from the bottom end of the vertical portion 121 to be surface-coupled to the upper surfaces of the seating flange portions 32 while surrounding the outer circumferential surface of the pole 1, and locking portions 125 bent from the front end of the horizontal portion 122 to be locked to peripheral portions of the seating flange portions 32. In addition, the housing connector 120 may further include reinforcing portions 123 integrally provided to connect both edges of the vertical portion 121 and the horizontal portion 122.

Here, as illustrated in FIG. 3 (or FIGS. 12A and 12B), the housing connector 120 may have a U-shaped open portion 124, the inner diameter of which is substantially greater than the outer diameter of the pole 1. Thus, in fitting to the pole 1, the locking portions 125 may be moved from a portion of the outer circumferential surface of the pole 1 facing the antenna module A toward the opposite side, i.e., front ends of the seating flange portions 32 of the seating clamp 30 positioned on the outer circumferential surface of the pole 1, so as to be locked to the opposite side.

The open portion 124 is formed to be open to a portion of the outer circumferential surface of the pole 1 opposite the above-described direction. A pair of locking portions 125 are provided on the front end of the open portion 124. The locking portions 125 may be bent to have a substantially C-shaped vertical cross-section such that a locking recess greater than the thickness of the seating flange portions among the components of the seating clamp 30 is formed.

Hereinafter, a process of fixedly assembling the guide arm unit 105 to the pole 1 will be briefly described with reference to FIGS. 11A to 12C.

First, as illustrated in FIGS. 11A and 11B, the inner seating clamp 30a and the outer seating clamp 30b among the components of the seating clamp 30 are brought into tight contact with portions of the outer circumferential surface of the pole 1 facing and opposite the antenna module A, respectively. Afterwards, the inner seating clamp 30a and the outer seating clamp 30b are firmly fixed using the fixing bolts (not shown) and the fixing nuts (not shown) extending through the bolt holes 33.

In addition, as illustrated in FIG. 12A, the housing connector 120 among the components of the guide arm unit 105 are horizontally moved in a direction from a portion of the outer circumferential surface of the pole 1 facing the antenna module A or the guide housing 110 to the opposite portion of the outer circumferential surface of the pole 1 (see reference numeral ① in FIG. 12A). Here, the housing connector 120 may be horizontally moved so that the U-shaped inner portion of the open portion 124 surrounds a portion of the outer circumferential surface of the pole 1. In addition, the housing connector 120 may be horizontally moved to a position at which the locking portions 125 may be fitted into the front ends of at least the seating flange portions 32 among the components of the seating clamp 30.

Thereafter, as illustrated in FIGS. 12B and 12C, the housing connector 120 is moved downward (see reference numeral ② in FIG. 12A). Subsequently, the housing connector 120 is horizontally moved toward the position of the antenna module A or the guide housing 110 so that the front ends of the seating flange portions are inserted into and locked to locking recesses (designated with no reference signs) formed in the locking portions 125 of the housing connector 120 (see reference sign ③ in FIG. 12A)

Afterwards, as illustrated in FIG. 12C, the guide housing 110 may be coupled to the housing connector 120 using the upper coupling clamp 10, the at least two upper fixing bolts 13, and the upper fixing nuts 14, thereby completing the assembly of the guide arm unit 105 to the pole 1.

Figure 13:
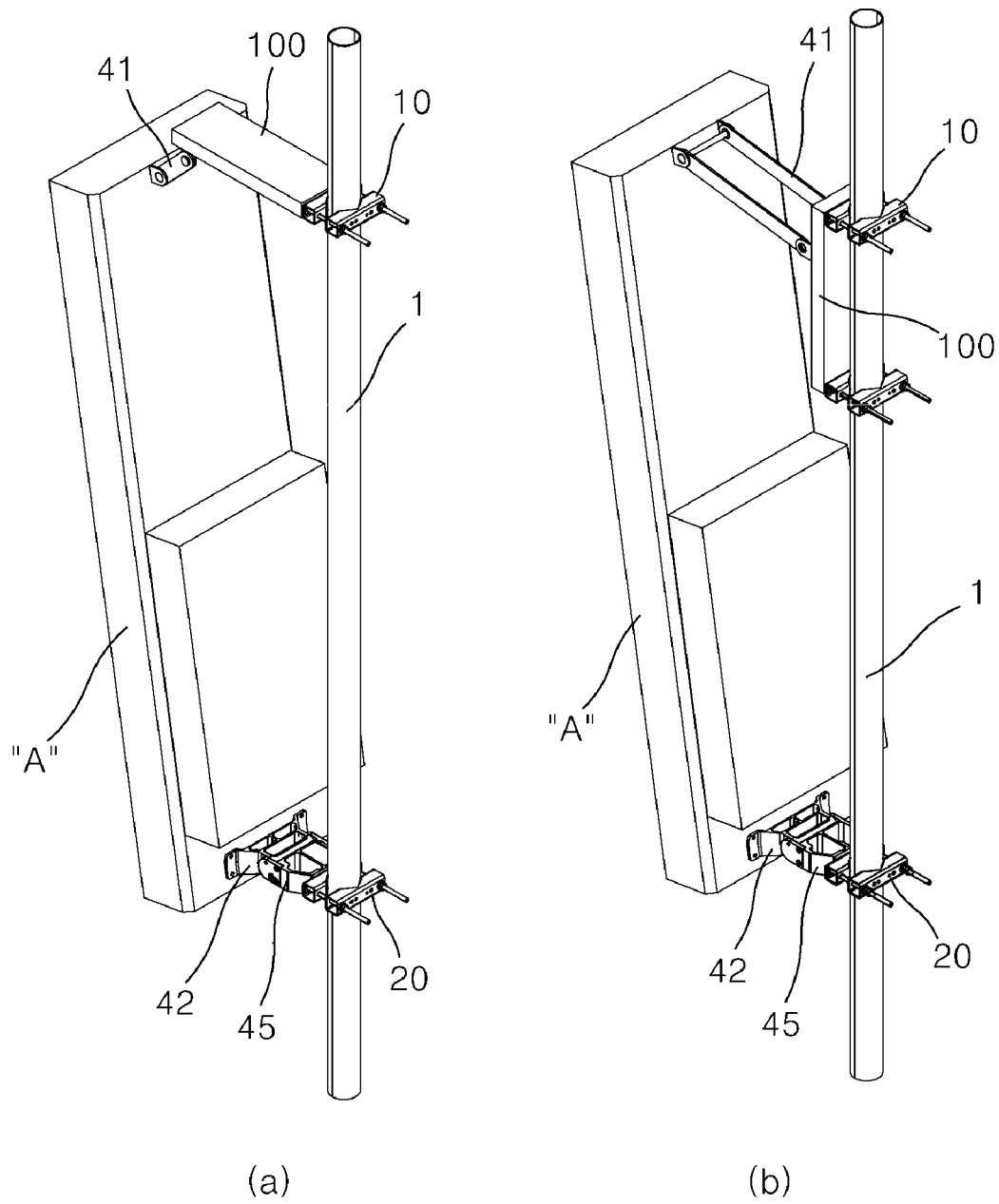
FIG. 13 is a side view illustrating a variety of examples in which the clamping device for a base station antenna according to the present disclosure is mounted.

FIG. 13 is a side view illustrating a variety of examples in which the clamping device for a base station antenna according to the present disclosure is mounted.

FIG. 13(a) schematically illustrates the mounted state of the tilting unit 101 of the clamping device 100 for a base station antenna according to an embodiment of the present disclosure as already described with reference to FIGS. 1 to 12C.

That is, the clamping device 100 for a base station antenna according to an embodiment of the present disclosure illustrated in FIG. 13(a) is embodied such that the guide arm unit 105 is disposed to horizontally extend to perpendicularly intersect the pole 1. Thus, the tilting unit 101 can adjust the tilting angle of the antenna module A while moving along the horizontally extending guide arm unit 105.

However, embodiments of the present disclosure are not necessarily limited to the above-described embodiment. As illustrated in FIG. 13(b), the present disclosure may be embodied such that the guide arm unit 105 may be disposed to vertically extend to be parallel to the pole 1, so that the tilting unit 101 can adjust the tilting angle of the antenna module A while moving along the vertically extending guide arm unit 105.

In embodiments of the base station antenna device having the above-described configuration according to the present disclosure, in particular, the driving of the tilting unit 101 can be remotely controlled by a wireless or wired medium. Thus, an operator is not required to climb the pole 1 disposed at a high position in order to directly adjust the directivity of the antenna module A. The directivity of the antenna module A can be remotely adjusted from, for example, a remote support center (not shown). Accordingly, there is an advantage in that the convenience of the operator and the reliability of a product can be significantly improved.

As set forth above, embodiments of the base station antenna device according to the present disclosure have been described in detail with reference to the accompanying drawings. However, embodiments of the present disclosure are not limited to the foregoing embodiments, and it is apparent to those skilled in the art that various changes may be made thereto without departing from the claims and equivalents thereof. Therefore, the true scope of the present disclosure should be defined by the appended claims.

INDUSTRIAL APPLICABILITY

The present disclosure provides the clamping device for a base station antenna, wherein the tilting of the antenna module mounted on a pole can be remotely adjusted, and the antenna module can be easily mounted and coupled to the pole.

The invention claimed is:

1. A clamping device for a base station antenna, the clamping device comprising:
a guide arm unit horizontally extending to one side to perpendicularly intersect a vertically disposed pole; and
a tilting unit disposed in the guide arm unit and configured to adjust a tilting angle with respect to the pole by horizontally moving, with respect to a bottom portion of an antenna module having a fixed hinge position, a top portion of the antenna module within the guide arm unit,
wherein the tilting unit comprises:
a screw bolt longitudinally extending in the guide arm unit and having a male thread on an outer circumferential portion; and
a tilting drive unit configured to move along the screw bolt and hinge-coupled to a top end of the antenna module through an upper pivot link.

2. The clamping device of claim 1, wherein the tilting drive unit comprises:
a drive unit housing having a predetermined space therein;
a drive motor provided in a motor housing coupled to the drive unit housing and configured to be electrically driven;
a drive gear configured to rotate in concert with a rotation shaft of the drive motor extending from the motor housing toward the drive unit housing and having gear teeth on an outer circumferential surface; and
a moving gear having a female thread formed at the center of rotation such that the screw bolt extends through and is coupled to the moving gear and gear teeth formed on the outer circumferential surface to be engaged with the drive gear.

3. The clamping device of claim 2, wherein the tilting drive unit further comprises:
a drive bearing support rotatably supporting the drive gear with respect to the drive unit housing; and
a moving bearing support rotatably supporting the moving gear with respect to the drive unit housing.

4. The clamping device of claim 2, wherein the tilting drive unit further comprises:
a pair of guide rails disposed on one widthwise side and another widthwise side of the guide arm unit, respectively, and extending in a longitudinal direction of the guide arm unit; and
a pair of moving guide blocks fixed to outer portions of the drive unit housing and coupled to the pair of guide rails, respectively, to mediate coupling of the drive unit housing.

5. The clamping device of claim 1, wherein the guide arm unit comprises:
a housing connector configured to mediate coupling of the guide arm unit to the pole; and
a guide housing connected to the housing connector and horizontally extending in a direction perpendicular to the pole,
wherein the guide housing has a downwardly-open C-shaped vertical cross-section.

6. The clamping device of claim 1, wherein the tilting unit is remotely drive-controlled by a wireless or wired medium.

7. The clamping device of claim 1, wherein the male thread of the screw bolt comprises one of a ball screw shape into which a ball having a predetermined size is inserted and a trapezoidal shape.

8. A clamping device for a base station antenna, the clamping device comprising:
- a guide arm unit horizontally extending to one side to perpendicularly intersect a vertically disposed pole; and
- a tilting unit disposed in the guide arm unit and configured to adjust a tilting angle with respect to the pole by horizontally moving, with respect to a bottom portion of an antenna module having a fixed hinge position, a top portion of the antenna module within the guide arm unit, wherein the guide arm unit comprises a housing connector configured to mediate coupling of the guide arm unit to the pole;
- wherein the clamping device further comprises:
- an upper coupling clamp and a lower coupling clamp coupled to the pole and spaced apart from each other a predetermined distance in a vertical direction; and
- a seating clamp provided below the upper coupling clamp and configured to seat and fix the housing connector thereon,
- wherein the guide arm unit is coupled to the pole by being fixed to the pole by means of the upper coupling clamp after the housing connector is seated on the seating clamp.

9. The clamping device of claim 8, wherein the upper coupling clamp is coupled to the guide arm unit hinge-fixed to a top end of the antenna module by means of an upper pivot link, and the lower coupling clamp is coupled to the antenna module by means of a pivot bracket hinge-fixed to a lower pivot link fixed to a bottom end of the antenna module.

10. The clamping device of claim 9, wherein the upper pivot link is configured such that one end is hinge-fixed to the antenna module in a hinge-pivotable manner and the other end is hinge-fixed to the guide arm unit in a hinge-pivotable manner, and the lower pivot link is configured such that one end is fixed to the antenna module and the other end is hinge-fixed to the pivot bracket in a hinge-pivotable manner.

11. The clamping device of claim 8, wherein the seating clamp comprises:
- a pole coupling portion tightly coupled to an outer circumferential surface of the pole; and
- a seating flange portion perpendicularly bent and radially extending from an upper portion of the pole coupling portion, thereby allowing the housing connector to be seated thereon.

12. The clamping device of claim 11, wherein the housing connector comprises:
- a vertical portion vertically disposed to be surface-coupled to the guide housing;
- a horizontal portion extending from a bottom end of the vertical portion to be surface-coupled to an upper surface of the seating flange portion while surrounding the outer circumferential surface of the pole; and
- a locking portion bent from a front end of the horizontal portion to be locked to a peripheral portion of the seating flange portion.

13. The clamping device of claim 8, wherein the upper coupling clamp and the lower coupling clamp comprise:
- one-side clamp blocks in tight contact with portions of the outer circumferential surface of the pole facing the antenna module;
- other-side clamp blocks in tight contact with portions of the outer circumferential surface of the pole opposite the one-side clamp blocks; and
- at least two fixing bolts extending through the one-side clamp blocks and the other-side clamp blocks so as to be nut-fastened.

14. The clamping device of claim 13, wherein the lower coupling clamp is hinge-fixed to a bottom end of the antenna module by means of a lower pivot link.

15. A clamping device for a base station antenna, the clamping device comprising:
- a guide arm unit vertically extending to one side to be parallel to a vertically disposed pole; and
- a tilting unit disposed in the guide arm unit and configured to adjust a tilting angle with respect to the pole by vertically moving, with respect to a bottom portion of an antenna module having a fixed hinge position, a top portion of the antenna module within the guide arm unit,
- wherein the tilting unit comprises:
- a screw bolt longitudinally extending in the guide arm unit and having a male thread on an outer circumferential portion; and
- a tilting drive unit configured to move along the screw bolt and hinge-coupled to a top end of the antenna module through an upper pivot link.

16. The clamping device of claim 15, wherein the tilting drive unit comprises:
- a drive unit housing having a predetermined space therein;
- a drive motor provided in a motor housing coupled to the drive unit housing and configured to be electrically driven;
- a drive gear configured to rotate in concert with a rotation shaft of the drive motor extending from the motor housing toward the drive unit housing and having gear teeth on an outer circumferential surface; and
- a moving gear having a female thread formed at the center of rotation such that the screw bolt extends through and is coupled to the moving gear and gear teeth formed on the outer circumferential surface to be engaged with the drive gear.

17. The clamping device of claim 16, wherein the tilting drive unit further comprises:
- a drive bearing support rotatably supporting the drive gear with respect to the drive unit housing; and
- a moving bearing support rotatably supporting the moving gear with respect to the drive unit housing.

18. The clamping device of claim 17, wherein the tilting drive unit further comprises:
- a pair of guide rails disposed on one widthwise side and another widthwise side of the guide arm unit, respectively, and extending in a longitudinal direction of the guide arm unit; and
- a pair of moving guide blocks fixed to outer portions of the drive unit housing and coupled to the pair of guide rails, respectively, to mediate coupling of the drive unit housing.

19. The clamping device of claim 15, wherein the guide arm unit comprises:
- a housing connector configured to mediate coupling of the guide arm unit to the pole; and
- a guide housing connected to the housing connector and vertically extending in a direction parallel to the pole, wherein the guide housing has an open C-shaped horizontal cross-section.

20. The clamping device of claim 16, further comprising:
- an upper coupling clamp and a lower coupling clamp coupled to the pole and spaced apart from each other a predetermined distance in a vertical direction; and a seating clamp provided below the upper coupling clamp and configured to seat and fix the housing connector thereon,
wherein the guide arm unit is coupled to the pole by being fixed to the pole by means of the upper coupling clamp after the housing connector is seated on the seating clamp.

* * * * *